US010367576B1

(12) United States Patent
Jenkins et al.

(10) Patent No.: US 10,367,576 B1
(45) Date of Patent: Jul. 30, 2019

(54) SYSTEM AND METHOD FOR DEMONSTRATION AND EVALUATION OF A NANOSATELLITE COMMUNICATION CONSTELLATION

(71) Applicant: The United States of America as represented by the Secretary of the Navy, San Diego, CA (US)

(72) Inventors: Alonzo E Jenkins, San Diego, CA (US); Peter J Yoo, San Diego, CA (US); Cherry Y Wakayama, Poway, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/963,592

(22) Filed: Apr. 26, 2018

(51) Int. Cl.
| H04B 7/185 | (2006.01) |
| H04L 12/24 | (2006.01) |
| H04L 12/26 | (2006.01) |
| H04L 12/931 | (2013.01) |

(52) U.S. Cl.
CPC ......... *H04B 7/18519* (2013.01); *H04L 41/22* (2013.01); *H04L 43/50* (2013.01); *H04L 49/351* (2013.01)

(58) Field of Classification Search
None
See application file for complete search history.

(56) References Cited

U.S. PATENT DOCUMENTS

| 6,048,366 A * | 4/2000 | Ellis .................. G09B 9/00 701/13 |
| 6,256,602 B1 * | 7/2001 | Ellis .................. G09B 9/00 701/13 |
| 7,584,085 B2 * | 9/2009 | Gold .................. G09B 9/006 703/8 |

(Continued)

FOREIGN PATENT DOCUMENTS

| CN | 104407520 A | * | 3/2015 |
| CN | 104407520 B | * | 1/2017 |

(Continued)

OTHER PUBLICATIONS

"Energy-Cognizant Scheduling of Store-and-Forward Communications with Multiple Priority Levels in Nanosatellite Systems," AIAA/USU Conference on Small Satellites (2016).

*Primary Examiner* — Fayyaz Alam
(74) *Attorney, Agent, or Firm* — Naval Information Warfare Center, Pacific; Kyle Eppele; Elliott J. Deaderick

(57) ABSTRACT

A system includes a computing device configured to implement a central user ground module that enables a user to emulate a plurality of central user ground nodes having fixed locations and that transmit and receive messages from at least one nanosatellite (nanosat), a second computing device configured to implement a remote user ground module that enables a user to emulate a plurality of remote user ground nodes that do not have fixed locations and that transmit and receive messages from at least one nanosat, and at least one additional computing device configured to implement a nanosat space module that emulates a nanosat, which transmits and receives messages from the ground nodes.

13 Claims, 6 Drawing Sheets

100

(56) References Cited

U.S. PATENT DOCUMENTS

| | | | | |
|---|---|---|---|---|
| 7,844,432 B1* | 11/2010 | Jones | ...................... | H04L 43/50 370/395.53 |
| 2006/0100846 A1* | 5/2006 | Lee | ......................... | B64G 7/00 703/22 |
| 2018/0260236 A1* | 9/2018 | Wang | .................. | G06F 9/45558 |

FOREIGN PATENT DOCUMENTS

| | | | | |
|---|---|---|---|---|
| CN | 106571956 | A | * | 4/2017 |
| CN | 106789404 | A | * | 5/2017 |

* cited by examiner

SYSTEM AND METHOD FOR
DEMONSTRATION AND EVALUATION OF A
NANOSATELLITE COMMUNICATION
CONSTELLATION

FEDERALLY-SPONSORED RESEARCH AND
DEVELOPMENT

The United States Government has ownership rights in the subject matter of the present disclosure. Licensing inquiries may be directed to the Office of Research and Technical Applications, Space and Naval Warfare Systems Center Pacific, Code 72120, San Diego, Calif. 92152. Phone: (619) 553-5118; email: ssc_pac_t2@navy.mil. Reference Navy Case No. 106525.

CROSS-REFERENCE TO RELATED
APPLICATION

This application is related to U.S. application Ser. No. 15/480,634 filed on 6 Apr. 2017, entitled "Energy-Cognizant Scheduling of Store-and-Forward Communications with Multiple Priority Levels in Satellite Systems."

BACKGROUND

The development of nanosatellite (nanosat) technology has resulted in increased operational usage of nanosats for various objectives. Nanosats have gained a significant amount of interest from government and commercial sectors to satisfy growing needs including remote sensing, scientific research and communications. Using traditional hardware-in-the-loop systems for developing and testing nanosat communication constellations is typically complex and expensive. A need exists to develop a system to evaluate a store-and-forward nanosat communication network including multiple nanosats and multiple ground nodes.

SUMMARY

The present disclosure describes a system and method for demonstration and evaluation of a nanosatellite communication constellation. In accordance with one embodiment of the present disclosure, a system is provided that includes: a computing device configured to implement a central user ground module that enables a user to emulate a plurality of central user ground nodes having fixed locations and that transmit and receive messages from at least one nanosatellite (nanosat), a second computing device configured to implement a remote user ground module that enables a user to emulate a plurality of remote user ground nodes that do not have fixed locations and that transmit and receive messages from at least one nanosat, and at least one additional computing device configured to implement a nanosat space module that emulates a nanosat, wherein the nanosat transmits and receives messages from the ground nodes.

BRIEF DESCRIPTION OF THE DRAWINGS

The elements in the figures may not be drawn to scale. Some elements and/or dimensions may be enlarged or minimized, as appropriate, to provide or reduce emphasis and/or further detail.

DETAILED DESCRIPTION OF VARIOUS
EMBODIMENTS

References in the present disclosure to "one embodiment" or "an embodiment" means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of "the," "a," or "an" are employed to describe elements and components of the embodiments herein; this is done merely for grammatical reasons and to conform to idiomatic English. This detailed description should be read to include one or at least one, and the singular also includes the plural unless it is clearly meant otherwise.

The embodiments disclosed herein describe a nanosatellite communication constellation testbed/system (NCCT) that is suitable, for example, to demonstrate the value of nanosat autonomy, perform parametric trades, and optimize mission approaches prior to deployment of a nanosat constellation.

Figure 1:
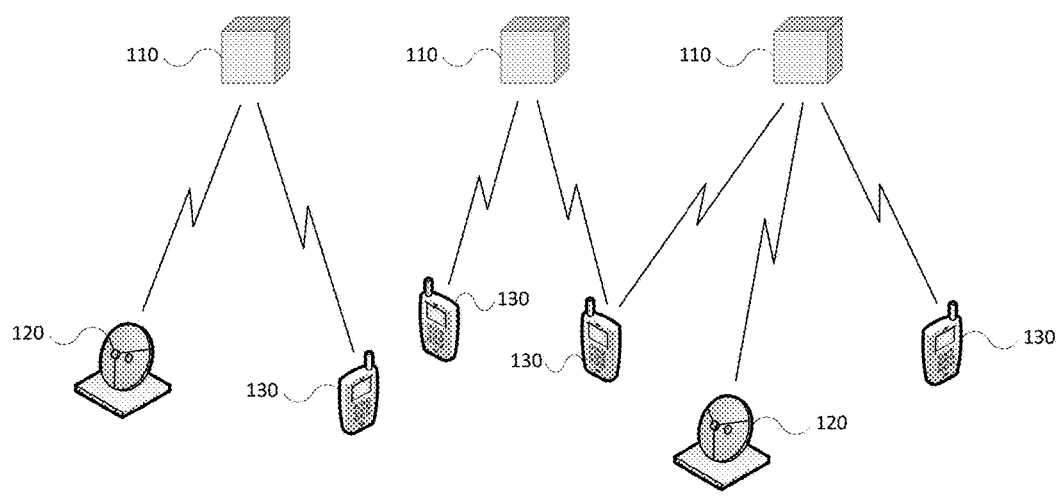
FIG. 1 is an example illustration of a store-and-forward nanosat communication architecture.

FIG. 1 shows an example of a store-and-forward nanosat communication architecture 100 that may be simulated by an NCCT in keeping with the System And Method For Demonstration And Evaluation Of A Nanosatellite Communication Constellation. The nanosats 110 may receive messages of different sizes and priorities from central user ground nodes 120 and remote user ground nodes 130. Each nanosat 110 may have a scheduling system that determines when to deliver messages to associated ground nodes 120 and 130. The scheduling system may utilizes various types of information to derive message delivery scheduling decisions, such information may include nanosat telemetry (e.g., message priority and size), orbit information (e.g., nanosat position and velocity), and nanosat battery level. Ground nodes 120 and 130 may be connected and capable of communication with one another as well as with the nanosats.

Figure 2:
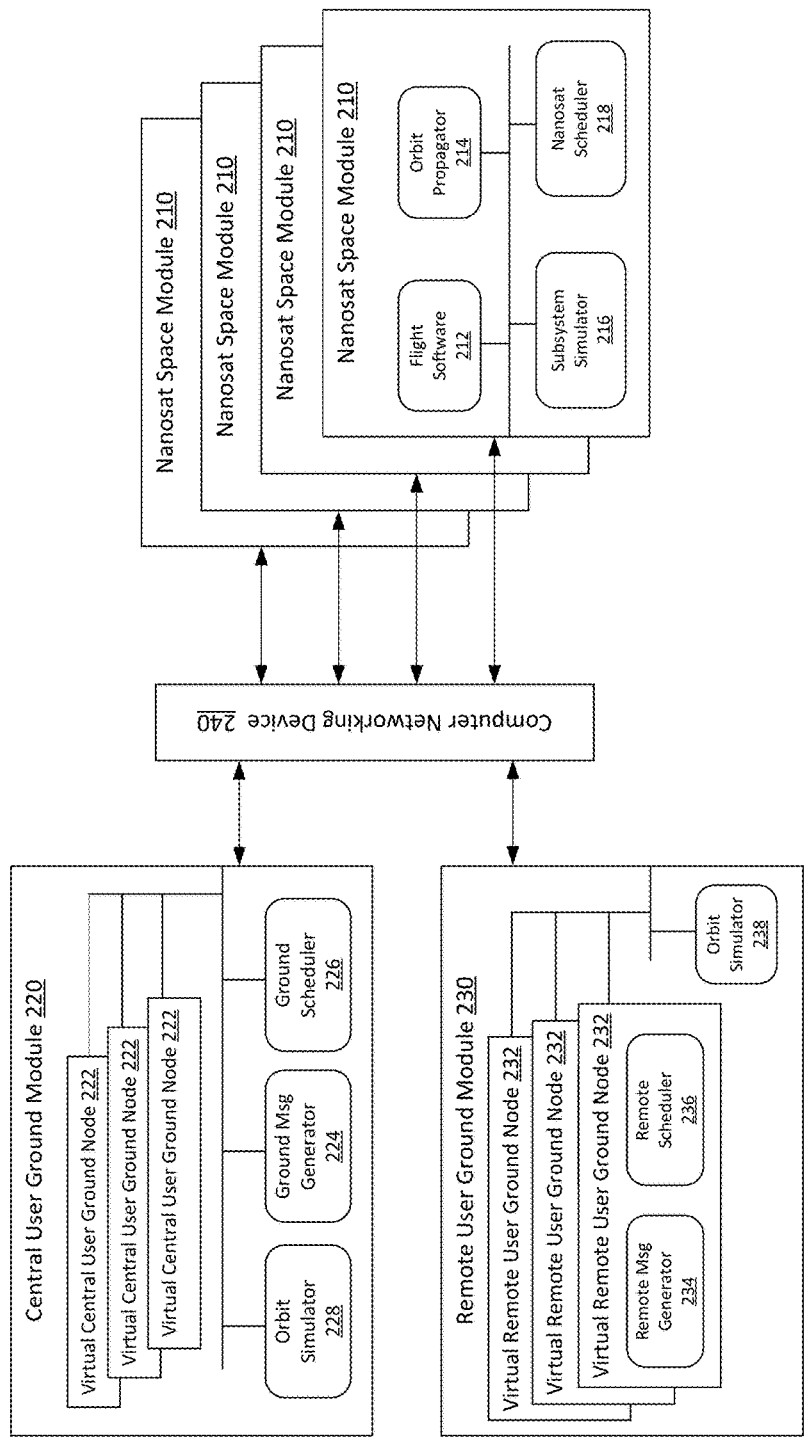
FIG. 2 is a block diagram of an embodiment of a system in accordance with the System And Method For Demonstration And Evaluation Of A Nanosatellite Communication Constellation.

FIG. 2 shows a block diagram of an embodiment of a system in keeping with the System And Method For Demonstration And Evaluation Of A Nanosatellite Communication Constellation. System 200, which is an embodiment of the NCCT capable of emulating/simulating the architecture shown and described in FIG. 1, may include a computing device configured to implement a central user ground module 220 that enables a user to emulate a plurality of central user ground nodes (represented by the plurality of virtual central user ground nodes 222) having fixed locations and that may transmit and receive messages from at least one nanosat (represented by nanosat space module 210). A second computing device may be configured to implement a remote user ground module 230 that enables a user to emulate a plurality of remote user ground nodes (represented by the virtual remote user ground nodes 232) that do not have fixed locations and that transmit and receive messages to/from at least one nanosat (represented by nanosat space module 210). At least one additional computing device may be configured to implement nanosat space module 210 that emulates a nanosat, wherein the nanosat transmits and receives messages from the ground nodes 222 and 232. In the present embodiment, modules 220 and 230 are represented in separate computing devices; however, in other embodiments the modules 220 and 230 may be represented in a single computing device.

The central user ground module 220 may further comprise a plurality of virtual central user ground nodes 222 (which emulate the plurality of central user ground nodes). Nodes 222 may emulate fixed-location ground nodes and may act as gateways between the nanosats and terrestrial networks. As an example, task requests (messages) for nanosats may be sent and received via the Internet, and incoming task requests may be coordinated and scheduled for specific time periods based on predicted passes of a nanosat, contact time windows, the priorities of the tasks, and/or other user-defined algorithms.

An orbit simulator 228 may be configured to provide scenario data for a specified nanosat constellation (see e.g., FIG. 1), wherein the scenario data includes contact time windows (the phrase "contact time/window/information" may be used interchangeably with the phrase "access time/window/information" throughout this detailed description). A ground message generator 224 may be configured to create random messages having different sizes, different priorities, and different destination ground nodes (which may be any of the ground nodes 222 and 232). A ground scheduler 226 may be configured to utilize user-defined scheduling algorithms to manage messaging between the virtual central user ground nodes 222 and the nanosats 210.

The remote user ground module 230 may further comprise a plurality of virtual remote user ground nodes 232 (which emulate the plurality of remote user ground nodes). Nodes 232 may emulate ground nodes that do not have fixed locations and thus may emulate mobile devices; nodes 232 may allow remote users to connect to terrestrial networks via the nanosats in scenarios where remote users do not have direct access to terrestrial networks. Each node 232 may include a remote message generator 234 and a remote scheduler 236. Remote message generator 234 may be configured in a manner substantially similar to ground message generator 224. Remote scheduler 236 may be configured to utilized user-defined scheduling algorithms to manage messaging between the virtual remote user ground nodes 232 and the nanosats 210. An orbit simulator 238 may be configured in a manner substantially similar to orbit simulator 228.

Nanosat space module 210 may further comprise flight software 212 configured to provides services for interfacing between the nanosat (as represented by module 210) and at least one of the computing device 220 and the second computing device 230 in order to send and receive commands and telemetry. An orbit propagator 214 may be configured to estimate and output future nanosat positions and velocities based on current measured values of nanosat position and velocity. A subsystem simulator 216 may include subsystem modules that function based on orbit parameters generated by the orbit simulators 228 and 238 in the central user ground module 220 and the remote user ground module 230. The subsystem modules may include a power subsystem, a communication subsystem, an attitude determination and control (ACDS) subsystem, and a guidance and navigation control (GNC) subsystem (additional description of the subsystem modules is provided in the Experimental Results section of this detailed description). A nanosat scheduler 218 may be configured to utilize information from the orbit propagator 214 and the subsystem simulator 216 to generate a message delivery schedule, wherein the schedule may take into account message priorities, onboard energy (available battery power from a nanosat battery that is charged using a solar array/panel), and contact time windows.

System 200 may further comprise a computer networking device 240 (which in some embodiments may be an Ethernet switch) configured to connect and enable communication between the computing devices 210-230 and also configured to implement user-defined network laws that affect connection and communication. The user-defined network laws may enable a user to control network conditions including, but not limited to, signal latency, signal interference, data rate, and packet loss. The user-defined network laws may be configured via a graphical user interface (GUI) and may be based on nanosat parameters that may be defined in the GUI.

Although the embodiment of system 200 shown in FIG. 2 has a specific number of ground nodes and nanosats, these are merely examples and are not controlling. An NCCT configuration may have fewer or greater ground nodes and nanosats as a desired system configuration may dictate. This reasoning is also applicable to architecture 100 shown in FIG. 1.

Figure 3:
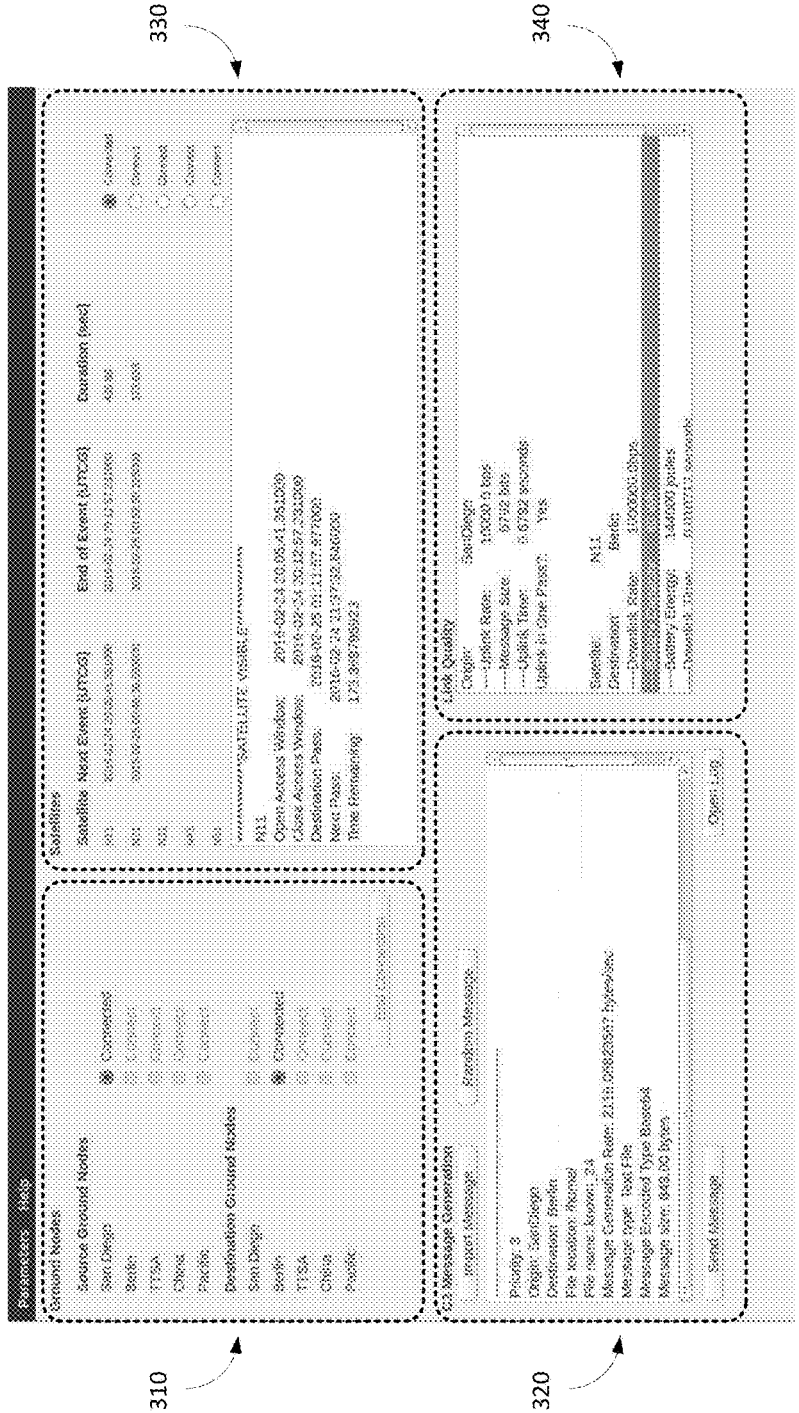
FIG. 3 is an example illustration of a graphical user interface in accordance with the System And Method For Demonstration And Evaluation Of A Nanosatellite Communication Constellation.

An embodiment of a GUI 300 utilized in accordance with the System And Method For Demonstration And Evaluation Of A Nanosatellite Communication Constellation is illustrated in FIG. 3. GUI 300 may be utilized in system 200 via the first computing device 220 or the second computing device 230, and GUI 300 may be configured to enable a user to perform various functions pertaining to the transmitting and the receiving of messages, including: select a message source ground node and a destination ground node (area 310); generate messages of different describing metrics including message size, message type, encoding, message priority, message origin, and message destination (area 320); upload databases to GUI 300 for viewing information, wherein the databases include nanosat characteristics including contact times and sunlight data (area 330); and analyze the performance of any user-defined algorithms and compare the performance of the algorithms pertaining to the remote scheduler and the ground scheduler (area 340).

Further aspects/details of GUI 300 will be described below with respect to a method for transmitting and receiving messages.

Sunlight data may refer to a sunlight charging time window, which includes information that may be utilized by the system to derive/alter a messaging schedule. Determining a sunlight charging time window includes determining whether a nanosat is or is not exposed to sunlight. A messaging schedule may be derived/altered to uplink/downlink messages from the nanosat when the nanosat is exposed to sunlight because the battery powering the nanosat is charged via solar panels. Uplinking/downlinking messages during nanosat sunlight exposure may be included as part of a messaging schedule in order to utilize a nanosat without depleting its battery.

Figure 4:
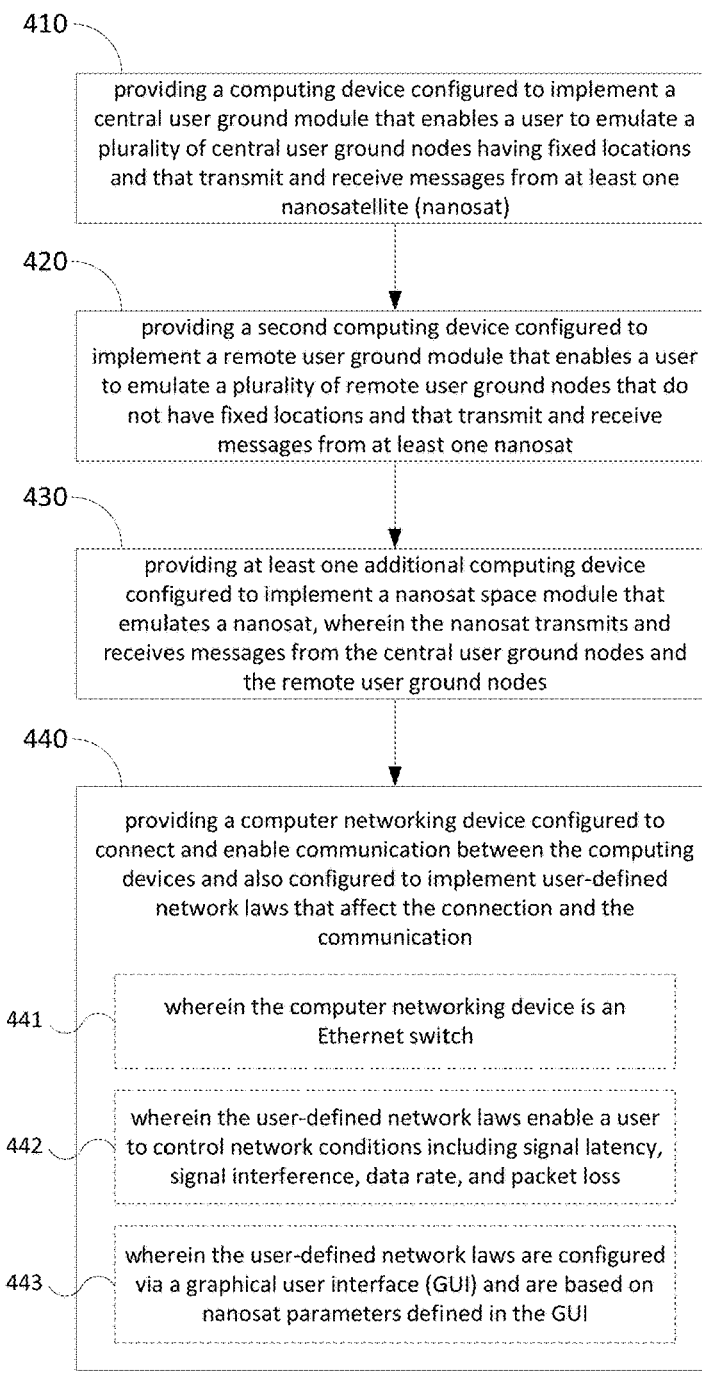
FIG. 4 is a flowchart diagram of an embodiment of a method in accordance with the System And Method For Demonstration And Evaluation Of A Nanosatellite Communication Constellation.

FIG. 4 is a flowchart diagram of an embodiment of a method 400 in keeping with the System And Method For Demonstration And Evaluation Of A Nanosatellite Communication Constellation. Method 400 may be implemented as a series of modules, and the modules may function in concert with physical electronic and computer hardware devices. Such modules may be utilized separately and/or together, locally and/or remotely, to form a program product thereof, which may be implemented through recordable media. Portions of method 400 may be stored within a non-transitory computer-readable medium and may be represented by computer-readable programming code.

For illustrative purposes, method 400 will be discussed with reference to system 200 in FIG. 2, and various other figures. Additionally, while FIG. 4 shows an embodiment of method 400, other embodiments of method 400 may contain fewer or more steps. Although in some embodiments the steps of method 400 may be performed as shown in FIG. 4, in other embodiments the steps may be performed in a different order, or certain steps may occur simultaneously with one or more other steps. The aforementioned statements regarding method 400 are also applicable to methods 500 (FIG. 5) and 600 (FIG. 6).

In method 400, step 410 includes providing a computing device configured to implement a central user ground module 220 that enables a user to emulate a plurality of central user ground nodes having fixed locations and that transmit and receive messages from at least one nanosat.

Step 420 includes providing a second computing device configured to implement a remote user ground module 230 that enables a user to emulate a plurality of remote user ground nodes that do not have fixed locations and that transmit and receive messages from at least one nanosat.

Step 430 includes providing at least one additional computing device configured to implement a nanosat space module 210 that emulates a nanosat, wherein the nanosat transmits and receives messages from the central user ground nodes and the remote user ground nodes.

Step 440 includes providing a computer networking device 240 configured to connect and enable communication between the computing devices 210-230 and also configured to implement user-defined network laws that affect the connection and the communication. Step 440 may also include sub-steps 441-443. Sub-step 441 includes wherein the computer networking device is an Ethernet switch. Sub-step 442 includes wherein the user-defined network laws enable a user to control network conditions including signal latency, signal interference, data rate, and packet loss. Sub-step 443 includes wherein the user-defined network laws are configured via a graphical user interface (GUI) and are based on nanosat parameters defined in the GUI.

Figure 5:
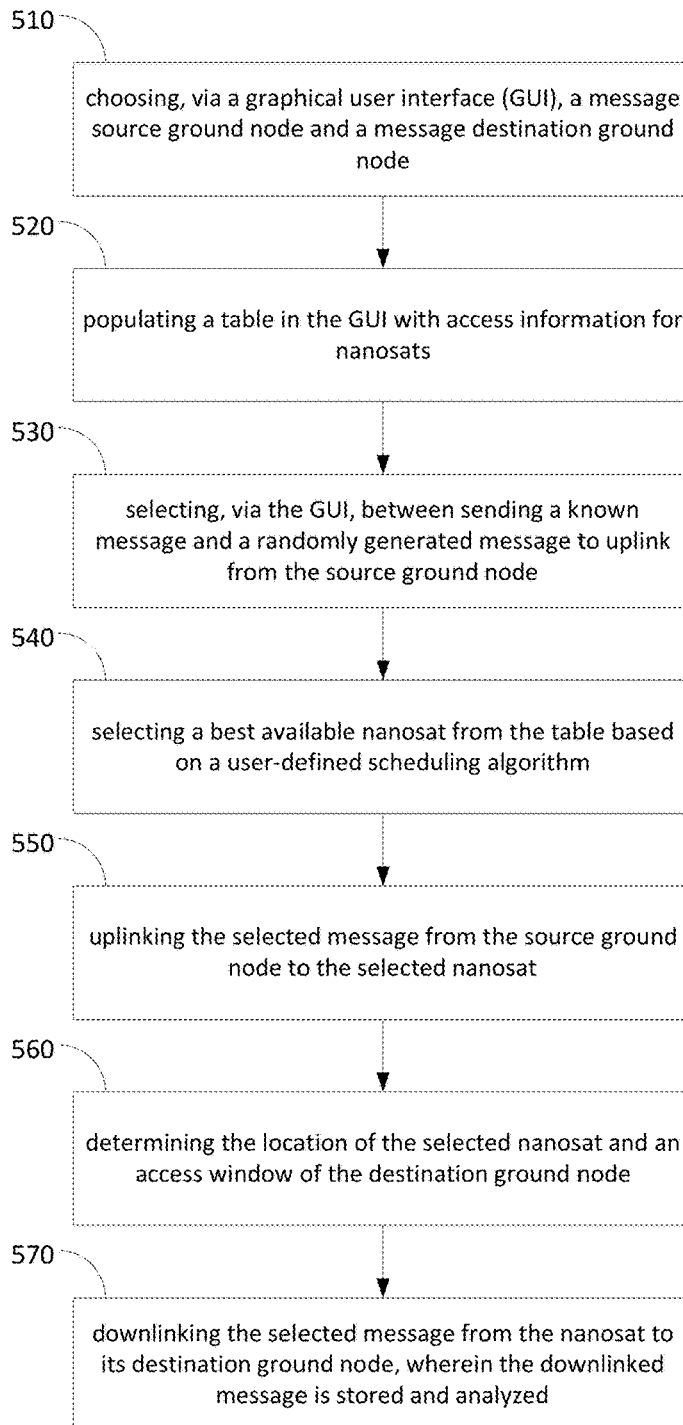
FIG. 5 is a flowchart diagram of an embodiment of a method in accordance with the System And Method For Demonstration And Evaluation Of A Nanosatellite Communication Constellation.
Figure 6:
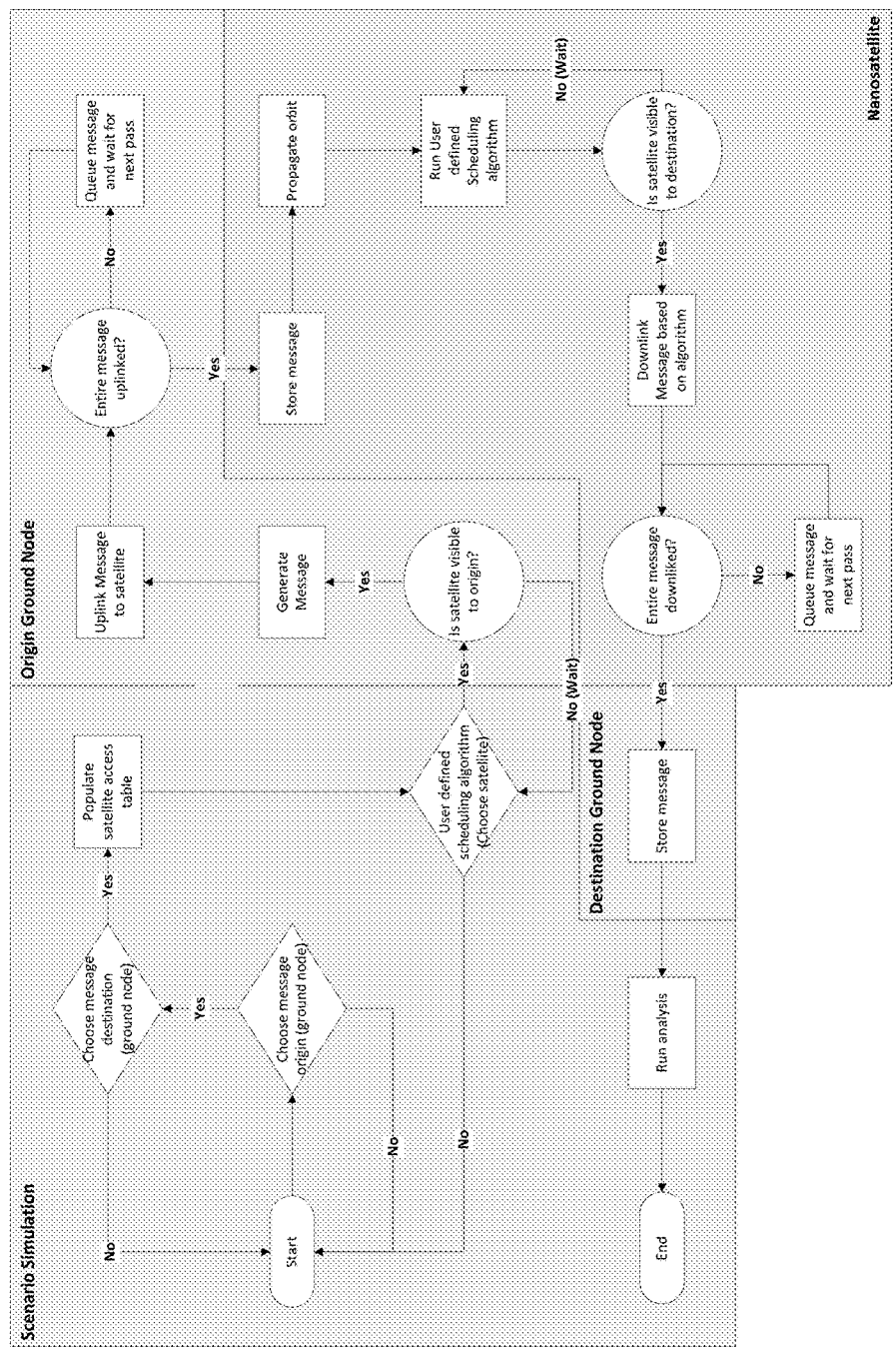
FIG. 6 is a flowchart diagram of an embodiment of a method in accordance with the System And Method For Demonstration And Evaluation Of A Nanosatellite Communication Constellation.

FIG. 5 is a flowchart diagram of an embodiment of a method 500 in keeping with the System And Method For Demonstration And Evaluation Of A Nanosatellite Communication Constellation. Method 500 concerns a method for transmitting and receiving messages via an embodiment of system 200.

Step 510 includes choosing, via a graphical user interface (GUI 300), a message source ground node and a message destination ground node (area 310).

Step 520 includes populating a table in GUI 300 with contact time information for nanosats (area 330).

Step 530 includes selecting, via GUI 300, between sending a known message and a randomly generated message to uplink from the source ground node (area 320).

Step 540 includes selecting a best available nanosat from the table (area 330) based on a user-defined scheduling algorithm.

Step 550 includes uplinking the selected message from the source ground node to the selected nanosat, wherein the uplinking may be performed when the selected nanosat is detected by the source ground node. In some embodiments, the selected message is automatically routed to the destination ground node and stored when the message is uplinked in a single pass (see area 340). The uplinking step may further comprise utilizing customized software code scripts to packetize the selected message and to make the selected message Consultative Committee for Space Data Systems (CCSDS) compliant.

Step 560 includes determining the location of the selected nanosat and an contact time window of the destination ground node, wherein the determining may be based on information from an orbit propagator 214.

Step 570 includes downlinking the selected message from the nanosat to its destination ground node, wherein the downlinked message is stored and analyzed. The downlinking may be performed after utilizing the user-defined algorithm to sort message delivery. In some embodiments, the analysis of the downlinked message may include analysis of at least three of message data corruption, elapsed time, latency, and nanosat utilization (area 340).

FIG. 6 is a flowchart diagram of an embodiment of a method 600 in keeping with the System And Method For Demonstration And Evaluation Of A Nanosatellite Communication Constellation. Method 600 is similar to method 500 and is not further described. FIG. 6 shows how method 600 is implemented through various portions of the NCCT including: origin and destination ground nodes, the nanosat, and the scenario simulation (the GUI) (see also Experimental Results section of this detailed description for further detail of testbed message flow in keeping with methods 500 and 600 (FIGS. 5 and 6)).

EXPERIMENTAL RESULTS

Described below are experimental results for the NCCT and its implementation. This experimental example includes various components and techniques that may be utilized as part of the testbed/system for purposes of demonstration and evaluation.

The implementation of the NCCT included various hardware such as a commercial embedded computer called BeagleBone Black (BBB) as a nanosat flight computer (also referred to as Nanosat Space Module), an Ethernet switch and cables for User Datagram Protocol (UDP) device communication, and a computer workstation with virtual machine software to emulate ground nodes.

The Central User Ground Node Module, which may be implemented on a personal computer (PC) workstation, is broken down into submodules including Virtual Central User Ground Nodes, Orbit Simulator, and Message Generator. The Virtual Central User Ground Node submodule may be utilized as part of simulation of message transmission and reception at central user ground nodes in different geographic areas. The Virtual Remote User Ground Node submodule simulates message transmission and reception at remote user ground nodes in different geographic areas. The Orbit Simulator submodule provides the scenario data including contact time windows between distributed ground node locations and nanosats for a specified nanosat constellation. As currently implemented, the contact time windows data is generated using Systems Tool Kit 11 (STK 11) by Analytical Graphics, Inc. (AGI). The Message Generation submodule creates random messages of different sizes, priorities, and destination ground nodes over time. The Remote User Ground Module contains sub modules that are in keeping with the submodules in the Central User Ground Module, but the submodules may be organized differently as shown in FIG. 2.

The Nanosat Space Module, implemented on a BBB, includes four submodules: Nanosat Flight Software, Orbit Propagator, Subsystem Simulator, and Autonomous Scheduling. Each of these submodules is described below.

The Nanosat Flight Software is developed by the US Naval Research Laboratory (NRL). It is a Linux-based, flight-ready software used for nanosat missions. It uses Consultative Committee for Space Data Systems (CCSDS) compliant message structure called "Space Packet" for all telemetry, commands, interface control requests and acknowledgements. For communicating with software in a spacecraft, it utilizes an IP-based/Ethernet between the Flight Computer and Payloads. The definition of a payload in the flight software core is defined broadly such that any components with UDP interface can be a payload. This means that a ground node can also be payload. This strategy aids payload developers when integrating their payloads. The flight software provides nine services for interfacing between the nanosat bus and payload, mainly for sending commands or receiving telemetry. The payload controls which nanosat bus services are used. Each service supports data flow with acknowledgement for flow control and/or data receipt verification. A short description for each bus service is described below:

Payload Command Forwarding—Send a command to a payload without interpretation to the content. The bus is essentially providing a bent-pipe service to transfer commands from a source to the designated payload. E.g., Power-on/-off.

Payload Telemetry—Report health and status telemetry of a payload to the bus. E.g., Payload temperature, voltage, etc.

Bus Command—Send a command to the bus. If the commands are destined for the bus, the bus will execute the commands. E.g., Flight software reset, telemetry log, turn off/on GPS, etc.

Bus Telemetry Packet—Get telemetry packets from the bus. All telemetry packets stored by the bus are available by request. E.g., Get ADCS (attitude determination and control) orientation data, GPS lock data, power status, command and fault counters, etc.

Bus Telemetry Stream—Stream bus telemetry down to ground using RF. E.g., Get ADCS orientation data, GPS lock data, power status, command and fault counters, etc.

Payload Data Storage—Store payload data on bus upon request. E.g., Log sensor data, save images.

Payload Data Downlink—Downlink payload data. E.g., Sensor data, images.

Payload Data Load—Transfer data from a file stored on the bus to the payload. E.g., Software update.

Time Service—Send time messages when a valid time and position message is received from a geolocation and time (GLT) system. E.g., GPS update.

The orbit propagator is used to estimate future satellite positions and velocities based on current measured values such as GLT input and Two Line Element (TLE). The orbit propagator interacts with the nanosat flight software to obtain GLT and TLE and also outputs its estimated values to the flight software to control radio transmissions.

The subsystem simulator provides simulated values found in a typical nanosat to other nanosat applications. Nanosat subsystems in the NCCT include:

Power subsystem including solar array/panel, battery, and power distribution;

Communications subsystem including radio, antenna, power amplifier, and low-noise amplifier;

Attitude determination and control (ADCS) subsystem including reaction wheels, inertial measurement unit (IMU), magnetometers, and a star-tracker camera; and Guidance and navigation control (GNC) subsystem including a GLT unit (e.g., a GPS receiver/tracker).

These abovementioned subsystems were simulated in the nanosat space module based on its on-orbit parameters obtained for a specified nanosat orbit generated using the orbit simulator. Via the subsystem simulator, the NCCT may simulate battery levels, satellite orientations, radio conditions, and GLT data.

The scheduling submodule (the nanosat scheduler) represents an autonomous message delivery scheduling system for store-and-forward communications nanosats. An autonomous message delivery scheduling strategy for nanosats may consider message priorities, onboard energy, and contact time windows with destinations to generate an optimal message delivery schedule. The scheduling submodule interacts with the orbit propagator and the subsystem simulator through the nanosat flight software to obtain information on future contact time windows with message destinations and nanosat energy levels.

The Ethernet switch and cables establish connectivity among the virtual ground nodes on the PC (or PCs) and the nanosats on the BBBs forming a nanosat communication constellation network. The UDP/IP protocols are used to transport content from each of the device to any other device connected in the network.

Each BBB may include the following specifications: Processor: AM335x 1 GHz ARM Cortex A8; at least 512 MB DDR3 Ram; at least 4 GB 8-bit eMMC flash storage; USB host; Ethernet; Android, and Linux OS (e.g., Debian and Ubuntu) support.

Various Ethernet switches, cables, and computers may be utilized as part of the NCCT. For this experiment, a 4-port Ethernet switch was utilized. However, based on the mission scenario, the Ethernet switch should be selected as appropriate to support at least the total number of nanosats and workstations that will host multiple ground nodes.

The flight software was developed by Pumpkin, Inc. The core flight software was developed using C, and was hosted in the BBB to perform command and data handling functions. Various modules connecting to the core flight software were developed using Python programming language.

Commercial software, VMWare, was used to set-up multiple virtual Linux-based ground nodes where GUIs are developed and utilized to configure simulation parameters and obtain mission analysis output.

The scheduling submodule (nanosat scheduler) situated in the nanosat space module may be considered a type of software payload located in the BBB. A software wrapper coded in Python allows for both interfacing with the core nanosat flight software services and rapid implementation of user-developed software. Data transport is achieved with the wrapper, which provides send/receive capability between ground nodes and nanosats. The interface with the core nanosat bus services makes telemetry data available for the scheduling submodule to use during message delivery scheduling decision computation.

An example scenario may include M number of ground nodes and N number of nanosats to emulate a nanosat communication constellation. The functions included for the scenario may include random message generation, message discretization, and message delivery. A database of ground nodes, nanosats, contact time windows, and sunlight time windows may be provided via STK simulation. The database may contain locations of ground nodes and information pertinent to communicating with the nanosats, e.g., the contact times to each ground node and the umbra, penumbra, and total eclipse times for each individual nanosat. The scenario simulation may also act as an interface to run user-defined scheduling strategies. In particular the testbed may be set up to demonstrate different message scheduling strategies including highest priority rule strategy and other proposed strategies. A high-level GUI was developed to incorporate the full functionality of the described scenario. Using the GUI, a user may select the message source ground node and destination ground node, generate messages of different describing metrics, upload databases containing nanosat/satellite characteristics including contact times and sunlight data, and analyze the performance of an algorithm (e.g., a user-defined scheduling algorithm) (see FIG. 3).

In keeping with FIG. 3, the GUI may include four main sections: Ground Nodes, Message Generation, Satellites, and Analysis Result. In the Ground Nodes section, the user has the option of setting the message source ground node and message destination ground node through the use of radio buttons. The underlying code for this process defines the IP address and port base address of each location for UDP connectivity. The Message Generation section is used to generate a message and send it to the destination ground node. There is code to either import a known message or to randomly generate a message. The message generated may be an XML (eXtensible Markup Language) file that defines message origin and destination, message priority, message size, original message type (e.g., audio, video, text file, email), etc. The send message command button creates space packets from the XML file and uplinks the packets to a nanosat flight computer using UDP. The Satellites section utilizes a pre-simulated STK database to show the contact time windows for the satellites. The user has the option to connect to a satellite if it is visible to the defined message source node. The Analysis Result section shows results pertinent to message transmission such as uplink and downlink rates and the performance of a user-defined algorithm.

A suite of open source and custom libraries in Python may be utilized, and the scenario simulation may be a Python script utilizing UDP to communicate with the ground nodes and flight software. Below is an example of message flow in the testbed:

When starting the simulation a GUI is displayed and shows the options.

For the demonstration a user can manually define the message origin/source ground node and message destination ground node.

Once both are chosen a table may populate with the contact time information for all satellites in the scenario.

The user may choose to send a known message or randomly generate a message to uplink from the origin ground node.

A user-defined ground scheduling algorithm may be computed to choose the best available satellite.

When the chosen satellite is visible to the origin ground node the message may begin to be uplinked. Custom Python scripts may be utilized to chunk/packetize the message and make it CCSDS compliant.

If the entire message is uplinked in a single pass, the flight software may automatically route the message to the software payload where it may be stored.

Orbital propagation information, e.g., in the form of an STK database, may determine the location of the satellite and the contact time window of the destination ground node.

The software payload may simultaneously run a user-defined nanosat scheduling algorithm to sort message delivery based on factors including, but not limited to, available transmit energy, message size, and message priority.

Once the computation is finished, messages will be downlinked to their appropriate destinations based on the results.

A fully downlinked message may then be stored and an analysis performed, thus ending the flow of a single message from origin to destination.

The use of any examples, or exemplary language ("e.g.," "such as," etc.), provided herein is merely intended to better illuminate and is not intended to pose a limitation on the scope of the subject matter unless otherwise claimed. No language in the present disclosure should be construed as indicating that any non-claimed element is essential.

Many modifications and variations of the present disclosure are possible in light of the above description. Within the scope of the appended claims, the embodiments of the system and methods described herein may be practiced otherwise than as specifically described. The scope of the claims is not limited to the disclosed implementations and embodiments but extends to other implementations and embodiments as may be contemplated by those having ordinary skill in the art.

What is claimed is:

1. A system comprising:

a computing device configured to implement a central user ground module that enables a user to emulate a plurality of central user ground nodes having fixed locations and that transmit and receive messages from at least one nanosatellite (nanosat);

a second computing device configured to implement a remote user ground module that enables a user to emulate a plurality of remote user ground nodes that do not have fixed locations and that transmit and receive messages from at least one nanosat, wherein each of the central user ground module and the remote user ground module include an orbit simulator configured to provide scenario data for a specified nanosat constellation, wherein the scenario data includes contact time windows; and at least one additional computing device configured to implement a nanosat space module that emulates a nanosat, wherein the nanosat transmits and receives messages to and from the ground nodes.

2. The system of claim 1, wherein the central user ground module further comprises:
a plurality of virtual central user ground nodes;
a ground message generator; and
a ground scheduler.

3. The system of claim 1, wherein the remote user ground module further comprises:
a plurality of virtual remote user ground nodes, wherein each node includes a remote message generator and a remote scheduler.

4. The system of claim 2, wherein the ground message generator is configured to create random messages having different sizes, priorities, and destination ground nodes.

5. The system of claim 3, wherein the remote scheduler is configured to utilize user-defined algorithms to manage messaging between the virtual remote user ground nodes and the nanosats.

6. The system of claim 1, wherein the nanosat space module further comprises:
flight software configured to provides services for interfacing between the nanosat and at least one of the computing device and the second computing device in order to send commands and receive telemetry;
an orbit propagator configured to estimate and output future nanosat positions and velocities based on current measured values of nanosat position and velocity;
a subsystem simulator; and
a nanosat scheduler configured to utilize information from the orbit propagator and the subsystem simulator to generate a message delivery schedule.

7. The system of claim 1, further comprising a graphical user interface (GUI) configured to enable a user to perform various functions pertaining to the transmitting and the receiving of the messages, including:
select a message source ground node and a destination ground node;
generate messages of different describing metrics including message size, message priority, message origin, and message destination;
upload databases to the GUI, wherein the databases include nanosat characteristics including contact times and sunlight data; and
analyze the performance of any user-defined algorithms and compare the performance of the algorithms pertaining to the remote scheduler and the ground scheduler.

8. The system of claim 1, further comprising:
a computer networking device configured to connect and enable communication between the computing devices and also configured to implement user-defined network laws that affect the connection and the communication.

9. The system of claim 8, wherein the computer networking device is an Ethernet switch, wherein the user-defined network laws enable a user to control network conditions including signal latency, signal interference, data rate, and packet loss, and wherein the user-defined network laws are configured via a graphical user interface (GUI) and are based on nanosat parameters defined in the GUI.

10. The system of claim 6, wherein the subsystem simulator includes subsystem modules that function based on orbit parameters generated by orbit simulators in the central user ground module and the remote user ground module, and wherein the subsystem modules include at least three of a power subsystem, a communication subsystem, an attitude determination and control (ACDS) subsystem, and a guidance and navigation control (GNC) subsystem.

11. A method comprising:
providing a computing device configured to implement a central user ground module that enables a user to emulate a plurality of central user ground nodes having fixed locations and that transmit and receive messages from at least one nanosatellite (nanosat);
providing a second computing device configured to implement a remote user ground module that enables a user to emulate a plurality of remote user ground nodes that do not have fixed locations and that transmit and receive messages from at least one nanosat, wherein each of the central user ground module and the remote user ground module include an orbit simulator configured to provide scenario data for a specified nanosat constellation, wherein the scenario data includes contact time windows; and
providing at least one additional computing device configured to implement a nanosat space module that emulates a nanosat, wherein the nanosat transmits and receives messages from the central user ground nodes and the remote user ground nodes.

12. The method of claim 11, further comprising:
providing a computer networking device configured to connect and enable communication between the computing devices and also configured to implement user-defined network laws that affect the connection and the communication.

13. The method of claim 12, wherein the computer networking device is an Ethernet switch, wherein the user-defined network laws enable a user to control network conditions including signal latency, signal interference, data rate, and packet loss, and wherein the user-defined network laws are configured via a graphical user interface (GUI) and are based on nanosat parameters defined in the GUI.

* * * * *